United States Patent
Martin, Jr.

(10) Patent No.: US 6,220,656 B1
(45) Date of Patent: Apr. 24, 2001

(54) CAB WITH IMPROVED OVERHEAD VISION

(75) Inventor: Robert P. Martin, Jr., Fairview Park, OH (US)

(73) Assignee: Martin Sheet Metal, Inc., Cleveland, OH (US)

( * ) Notice: Subject to any disclaimer, the term of this patent is extended or adjusted under 35 U.S.C. 154(b) by 0 days.

(21) Appl. No.: 09/533,574

(22) Filed: Mar. 23, 2000

(51) Int. Cl.[7] .................................................. B60J 7/11
(52) U.S. Cl. ................ 296/215; 296/190.03; 296/190.1; 296/218; 49/501; 52/204.62; 52/801.1
(58) Field of Search .................. 296/29, 30, 102, 296/188, 190.03, 190.1, 215, 218; 49/501; 52/200, 204.62, 781, 801.1, 801.12; 160/368.1, 369, 371

(56) References Cited

U.S. PATENT DOCUMENTS

| D. 249,254 | 9/1978 | Martin, Sr. .............................. D34/37 |
| D. 274,276 | 6/1984 | Martin, Jr. .............................. D34/37 |
| 3,954,150 | * 5/1976 | Cole et al. ......................... 180/89.12 |
| 4,079,985 | 3/1978 | Martin ............................. 296/190.03 |
| 4,095,839 | * 6/1978 | Lawrence et al. .............. 296/190.03 |
| 4,119,340 | * 10/1978 | Wolfe .................................... 296/215 |
| 4,205,874 | 6/1980 | Martin .................................. 296/102 |
| 4,392,669 | 7/1983 | Martin, Jr. ............................ 280/775 |
| 4,702,516 | 10/1987 | Martin, Jr. ......................... 296/190.1 |
| 4,940,280 | * 7/1990 | Templeton ...................... 296/190.03 |
| 5,286,081 | 2/1994 | Martin, Jr. ...................... 296/190.08 |

FOREIGN PATENT DOCUMENTS

| 623571 | * 7/1961 | (CA) .................................... 296/215 |
| 813492 | * 5/1959 | (GB) .................................... 296/215 |

OTHER PUBLICATIONS

"Year–round convertible", Technology & Trends, p. 181, Ward''s Auto World, Mar. 1989.*

* cited by examiner

Primary Examiner—D. Glenn Dayoan
Assistant Examiner—Paul Chenevert
(74) Attorney, Agent, or Firm—Pearne & Gordon, LLP

(57) ABSTRACT

An overhead guard for a vehicle, in the form of a cab for a lift truck, that affords both protection and a high degree of overhead visibility with a relatively open grille work of steel bar and an impact-resistant glazing sheet. The glazing sheet is sandwiched between a rigid framework and a sheet metal panel having a large cutout for the overhead view. Gusset plates reinforce the corners of the framework and provide convenient mounting locations for an air circulating fan. Threshold adaptor brackets are mounted in step pockets of the vehicle chassis to simplify the door structure while permitting the cab to be effectively sealed from the environment when the doors are closed.

8 Claims, 5 Drawing Sheets

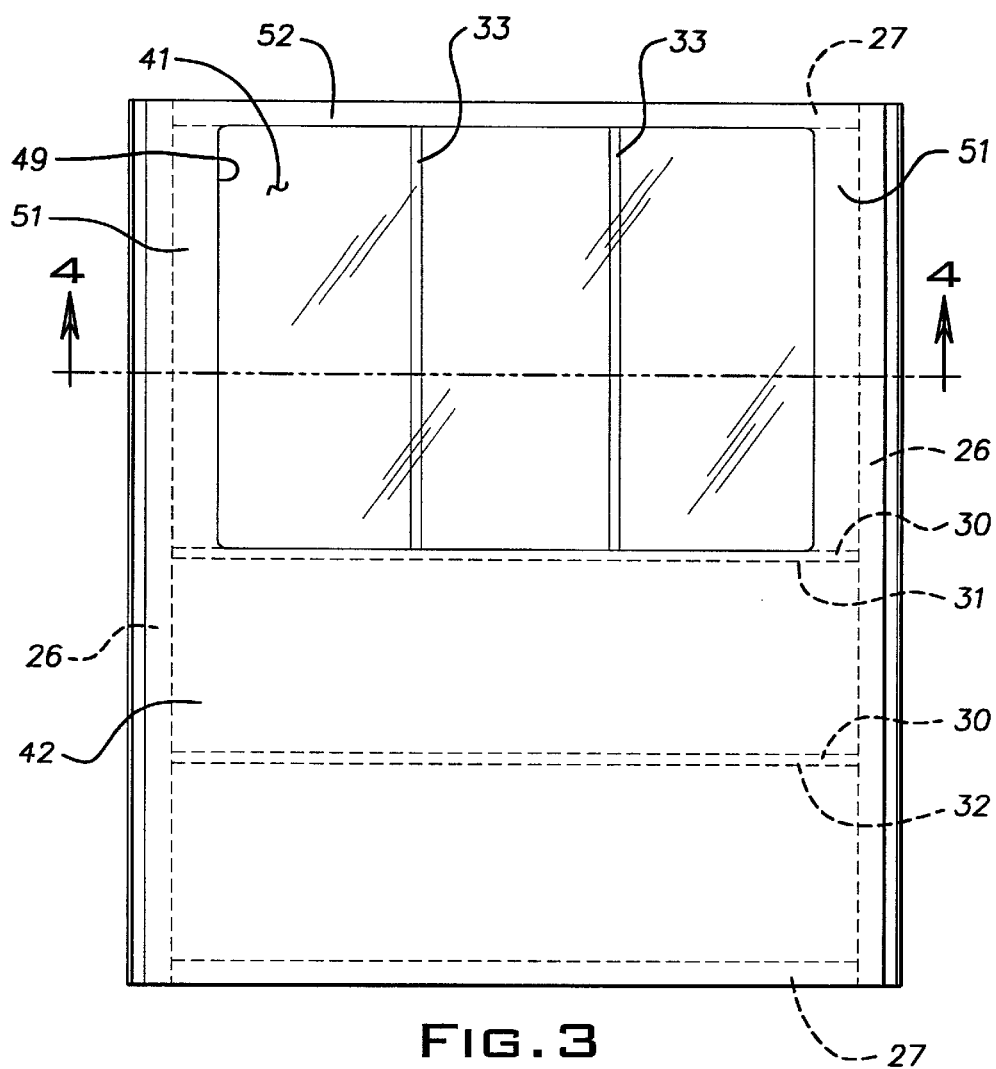
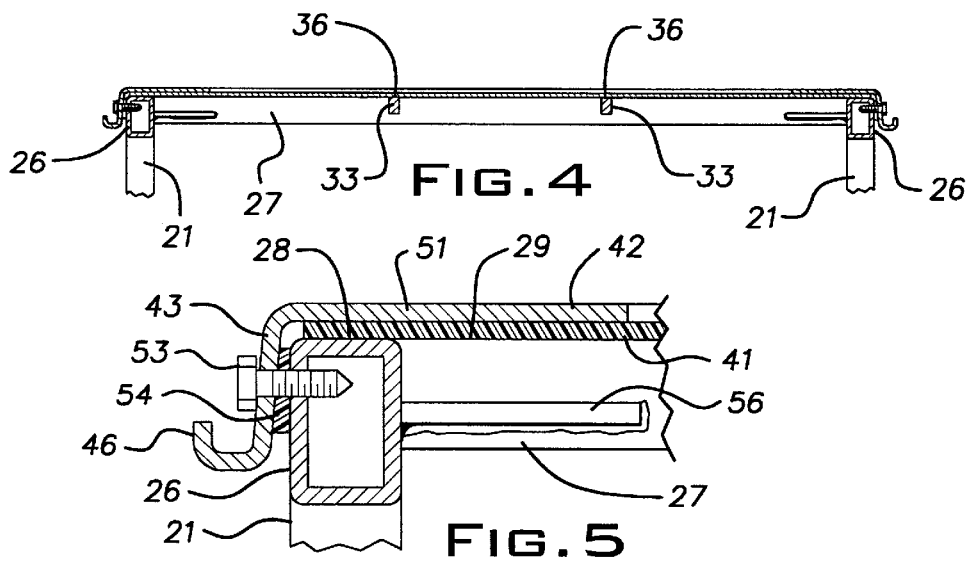

CAB WITH IMPROVED OVERHEAD VISION

BACKGROUND OF THE INVENTION

The invention relates to improvements in cabs for land vehicles such as lift trucks.

PRIOR ART

Lift trucks and other commercially used non-highway vehicles such as tractors, loaders, excavators, cranes and the like are frequently fitted with a cab to protect the driver or operator from hostile environments created by adverse weather, noise, dust and the like. It is important that the cab provide adequate strength to protect the operator in the case of a roll-over or from falling objects and, at the same time, provide as much visibility for the operator as is practical. U.S. Pat. Nos. 4,079,985, Des.249,254, 4,205,874, 4,392,669, Des.274,276, 4,702,516 and 5,286,081 illustrate examples of lift truck cabs.

SUMMARY OF THE INVENTION

The invention provides an improved rigid cab construction which affords both overhead protection and excellent vision for the operator. The disclosed cab construction, in addition to its performance characteristics, is relatively inexpensive to manufacture and is durable in service.

In accordance with the invention, the cab achieves a high level of overhead protection, meeting that specified by national standards, with a combination of impact resistant glazing and associated rigid bar-like elements.

Still further, the disclosed cab is relatively light in weight particularly in its roof construction so that it does not adversely affect the center of gravity of the vehicle on which it is installed.

In accordance with one aspect of the invention, the cab door structure is simplified over conventional arrangements by a step member that eliminates the need for a step down door profile while still enabling the door to adequately seal the cab.

Another aspect of the invention involves a frame stiffening gusset, preferably located at the cab corners adjacent the roof that serves as a convenient mounting surface for an air circulating fan.

In the illustrated embodiment, a sheet of glazing material is sandwiched between underlying rigid frame members and an overlying metal roof sheet having an expansive opening to permit overhead vision. The roof panel, which is preferably metal, serves to retain the glazing sheet in place on the frame members. In the illustrated construction, the roof panel is relatively large such that its front to back dimension is about twice as long as the vision opening. This permits the roof panel to shade the operator's space. After an extended period of service, the roof panel is temporarily removed and the glazing sheet is rotated 180° about a vertical axis to dispose a previously covered half of the sheet to be located under the vision opening. In this way, the viewed area of the sheet is effectively renewed. The glazing eliminates the need for a safety grille of small openings and thereby avoids a corresponding obstruction to overhead vision by a multitude of grill elements.

BRIEF DESCRIPTION OF THE DRAWINGS

FIG. 3 is a plan view of the roof of the cab;

FIG. 4 is a cross-sectional view of the roof of the cab taken in the plane indicated in FIG. 3 by the lines 4—4;

FIG. 5 is a fragmentary cross-sectional view of the roof on an enlarged scale;

DESCRIPTION OF THE PREFERRED EMBODIMENT OF THE INVENTION

Figure 1:
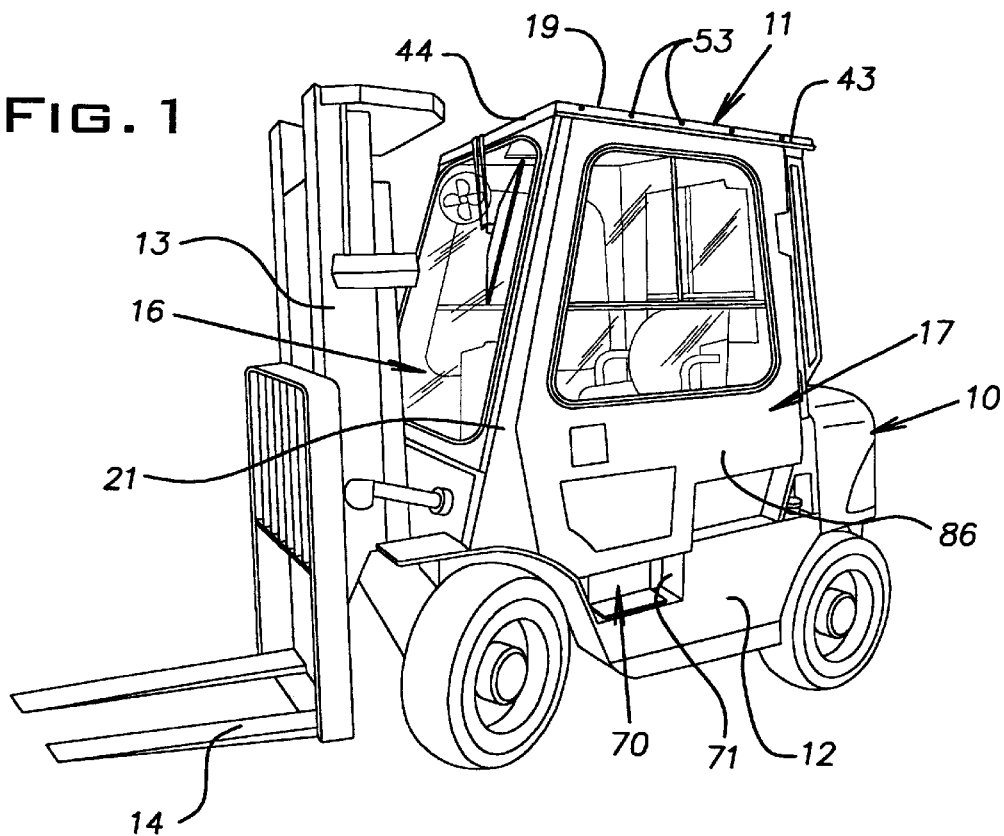
FIG. 1 is a front perspective view of a lift truck and a cab constructed in accordance with the invention.
Figure 2:
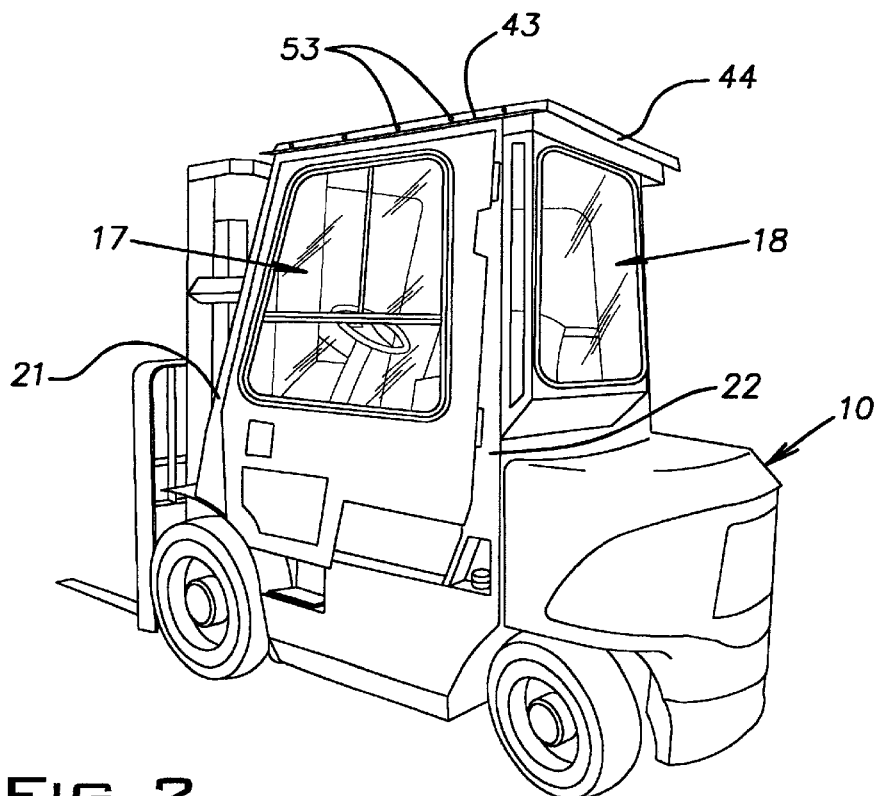
FIG. 2 is a rear perspective view of the truck and cab.

Referring now to the figures, there is shown a wheeled vehicle 10 in the form of a lift truck of generally conventional construction. An overhead guard in the form of a rigid cab 11 constructed in accordance with the invention is bolted or otherwise fixed to the chassis 12 of the lift truck vehicle 10 in a known manner. The lift truck 10 in a customary manner has an internal combustion engine or a battery-operated electric motor for propulsion and has a mast 13 supporting a carriage and lift forks 14 at its front.

The cab 11 encloses the operator of the lift truck 10 to shield him or her from adverse environmental conditions. The cab 11 has a generally overall shape of a box with a front 16, two sides 17, a back 18, and a roof 19. In a generally conventional manner, the front and rear faces can, as shown, be glazed with suitable safety glass and the sides can comprise hinged doors also with safety glass glazing. Rigid corner posts or members 21, 22 exist where the sides 17 intersect the front and rear faces of the cab 11. The corner posts 21, 22 can be formed, for example, of structural steel tubing and/or fabricated from sheet steel. It is desirable that the corner posts 21, 22 are relatively narrow to avoid obstructing the view of the operator while being sufficiently strong to resist buckling or other failure in the event that a heavy object would fall onto the roof 19 or if the vehicle 10 were to overturn. The corner posts or members 21, 22 are interconnected by header members 26 and cross members 27 that have their ends welded to respective ones of the corner members 21, 22 directly or indirectly. The header members 26 and cross members 27 can be rectangular steel tubing. The header members 26 and cross members 27, in the illustrated case forming a rectangle, make up a supporting framework for the roof 19. Each of the header and cross members have an upper surface 28, 29 lying in a common plane. A pair of bars 31, 32 parallel to the cross members 27 are welded to the side header members 26 preferably with their upper surfaces 30 coplanar with the upper surfaces 28, 29 of the header and cross members. One of the bars 31 is located approximately at mid-length of the roof area while the other 32 is between this mid-position bar and the rear cross piece or member 27. Two parallel bars 33 extend forwardly from the mid-position bar 31 to the front cross piece or member 27. These bars 33, as shown, are spaced about evenly from the side headers 26 and each other. The bars 33 have their ends welded to the front cross piece 27 and to the mid-position bar 31. Upper faces 36 of the bars 33 lie in the common plane of the header and cross member surfaces 28, 29. In one cab model, by way of example, where the roof is approximately 38 inches wide and 44 inches long, the side headers can be formed of 2"×3"×3/16" steel tube and the front and rear headers or cross members can be formed of 1"×2"×10 gauge steel tube. The bars can be solid steel with a cross section of 3/4" by 1 1/4". Of course, other suitable structural shapes including rounds, tubes and angles can be substituted for these headers, cross pieces and bars.

A sheet 41 of impact-resistant glazing material overlies the framework comprised of the header and cross members 26, 27 and as well as the bars 31, 32 and 33. A preferred glazing material is clear polycarbonate of 3/16" or 1/4" thickness, for example. Other thicknesses and other transparent materials such as rigid vinyl, acrylic, or safety glass are contemplated. The glazing sheet 41 has dimensions slightly less than the outer perimeter of the roof framework.

A roof panel 42 overlies the glazing sheet 41. In the illustrated example, the roof panel 42 is fabricated from a single sheet of stock, for example, 13 gauge steel. Flanges 43, 44 of the roof panel 42 are turned downwardly and create the general shape of an inverted pan. At the sides, the flanges 43 include an upturned edge 46 to form a rain gutter. The downturned flanges 43, 44 can be welded together at the corners of the panel 42 for stiffening purposes. The flanges 43, 44 cover at least portions of the respective vertical faces of the header and cross members 26, 27. The roof panel 42 has a large opening 49 in the forward half of its area that overlies the operator station of the vehicle 10. The panel 42 has relatively narrow portions 51, 52, measured in the plane of the panel, extending along the sides and front of the opening 49.

The roof panel 42 is removably retained on the roof framework by suitable fasteners 53 such as self-drilling and tapping screws. The screws 53, spaced along the length of each of the side flanges 43, extend horizontally through the flanges and into the side headers 26. Shims 54 of suitable material such as hard plastic, rubber or metal are selected on the basis of thickness to fill any small gap existing between each flange 43 and the adjacent side header. The shims can be provided in the configuration of a washer with a preexisting aperture or can have a U-shape configuration or can be pierced by a screw as the screw is being installed.

Figure 6:
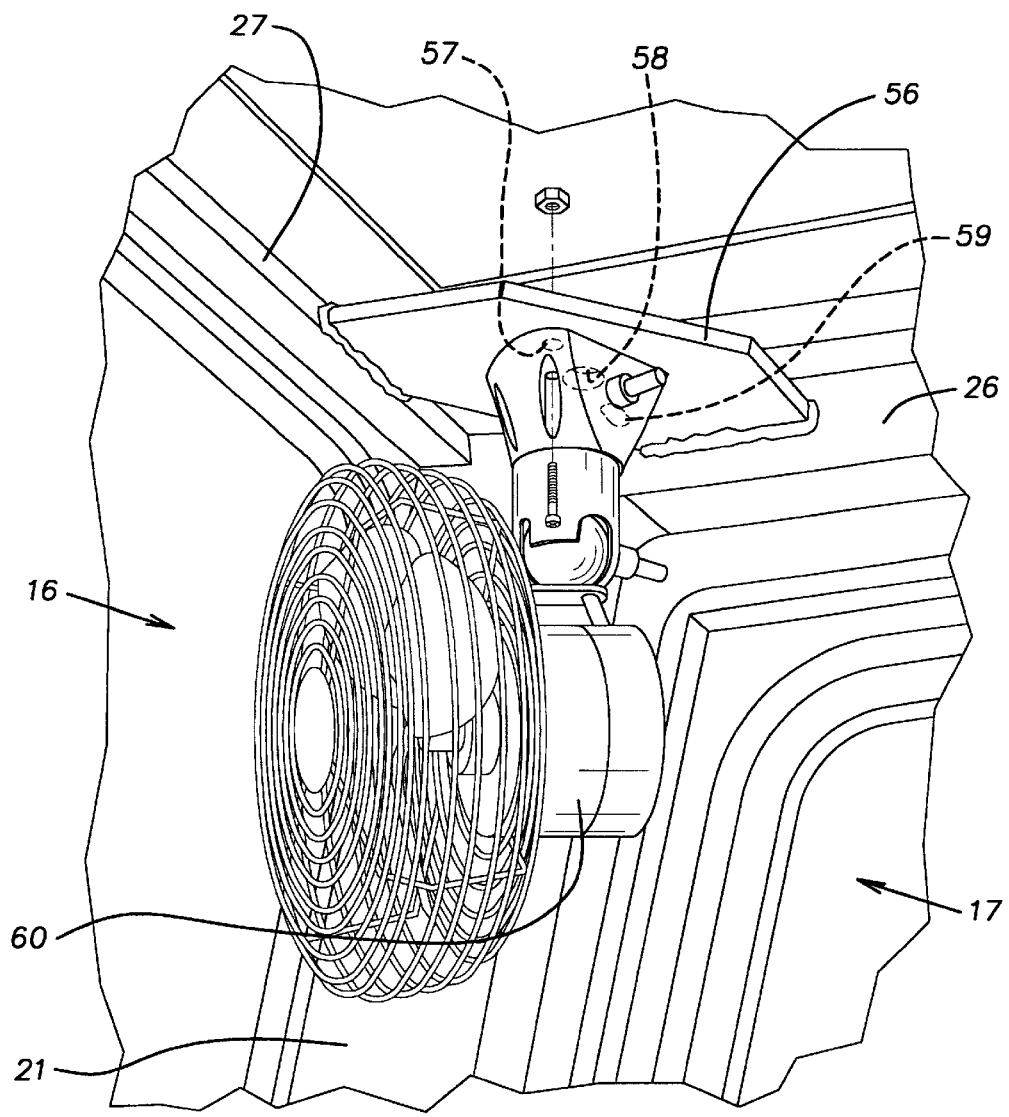
FIG. 6 is a perspective view from inside the cab showing a frame reinforcing gusset used to mount an electric fan within the cab.

With reference to FIG. 6, the inside corners of the roof framework are reinforced with a polygonal steel gusset plate 56. The gusset plates 56, which are identical, are prepunched or drilled with holes 57–59 in their central regions. The holes 57–59 are conveniently used to receive screws for optionally mounting an auxiliary electrically operated fan 60. The gussets 56 are welded parallel to and somewhat below the plane of the upper surfaces 28, 29 of the header and cross members 26, 27. With the gussets 56 being provided at all four corners, the owner or operator of the vehicle has the ability to have a fan mounted at any desired corner or corners within the cab.

Figure 9:
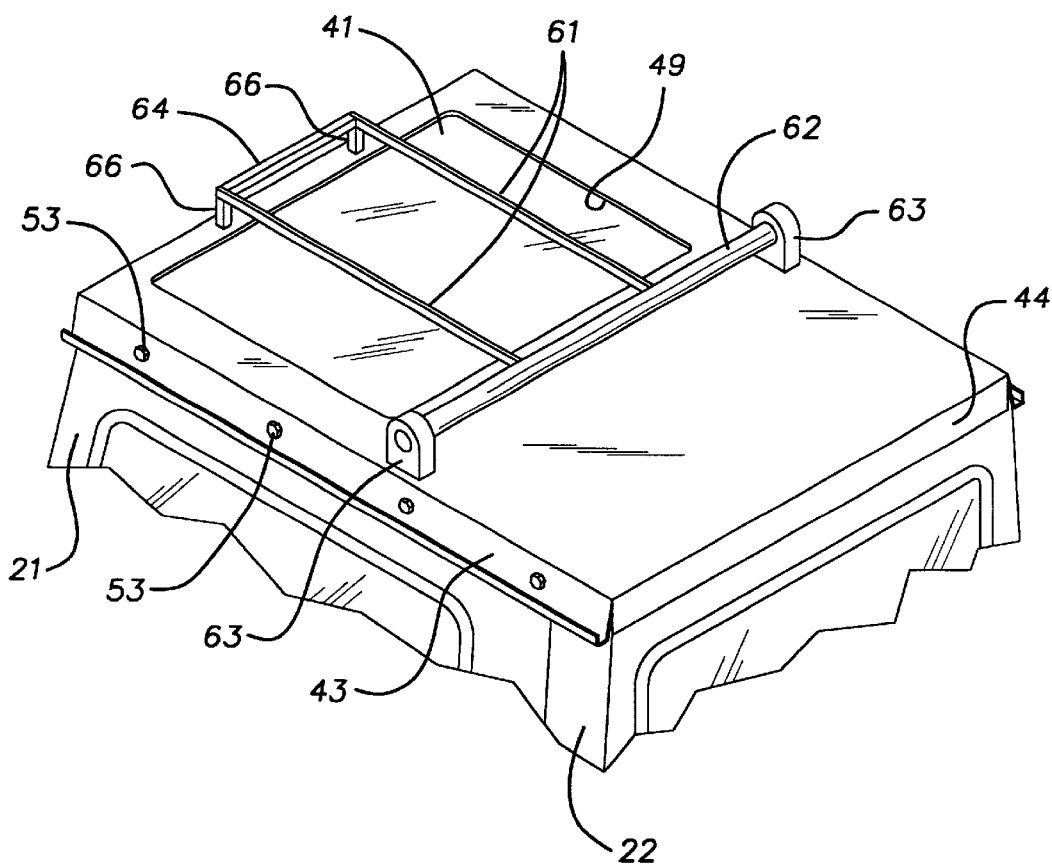
FIG. 9 is a fragmentary perspective view of a modified form of the roof structure of the cab.

Referring to FIG. 9, there is shown a modification of the cab of the invention wherein parts like that described in connection with the cab 11 are identified with like numerals. In this construction, bars 61 overlie the vision opening 49 and replace the bars 33 of the cab 11. The previously described header members 26, cross members 27 and bars 31, 32 or their equivalents are used to support the glazing sheet 41 and roof panel 42. At their rearward ends, the bars 61 are welded to a cross bar 62. The cross bar is pivotally supported on brackets 63 which allow the cross bar 62 to pivot about its horizontal longitudinal axis. At their forward ends, the bars 61 are welded to a cross piece 64. The brackets 63 overlie respective header members 26. Welded to the forward ends of the bars 61 are associated short legs 66. The short legs 66 overlie the front cross member 27. The pivotal support provided by the cross bar 62 allows the bars 61 and cross piece 64 to be raised for purposes of cleaning the glazing in the opening 49. The bars 61, cross bar 62 and cross piece 64 are preferably in a common plane and are slightly elevated above the roof panel 42 and glazing 41 to further assist in maintaining the glazing clean and free of accumulated dirt and debris. The brackets 63 are fixed to the roof panel by welding, bolts or other suitable manner.

Figure 7:
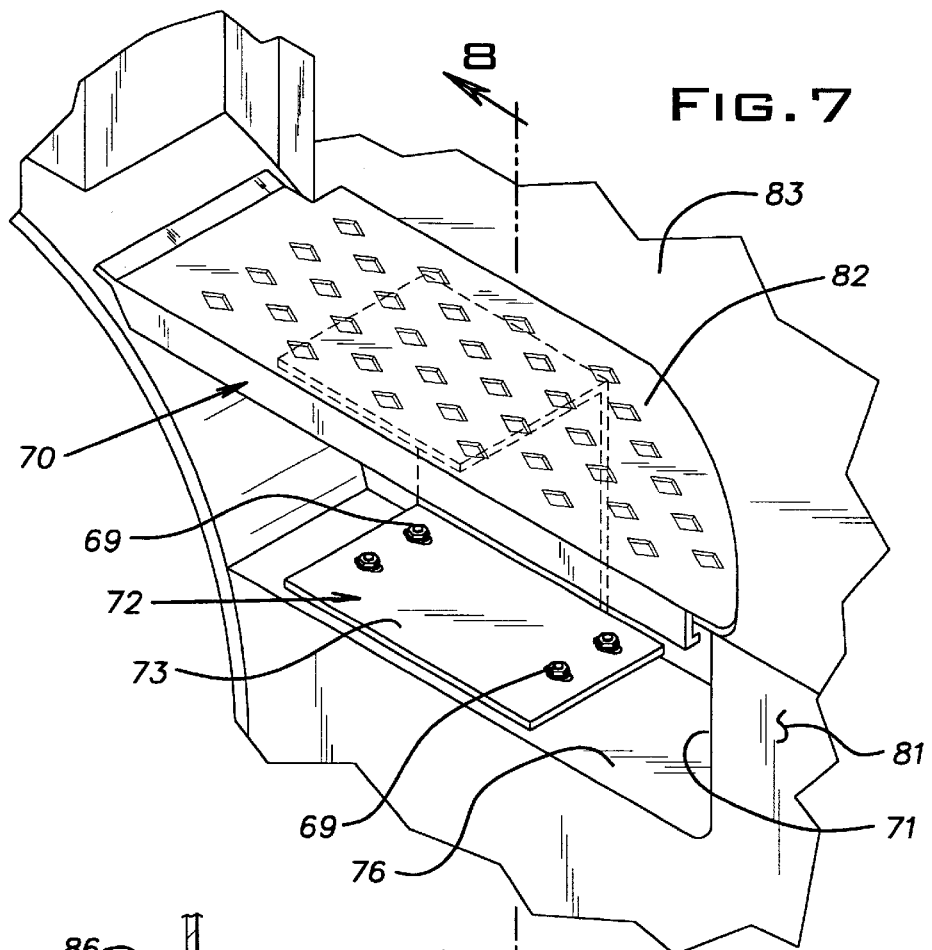
FIG. 7 is a perspective view on an enlarged scale of a step threshold adaptor.
Figure 8:
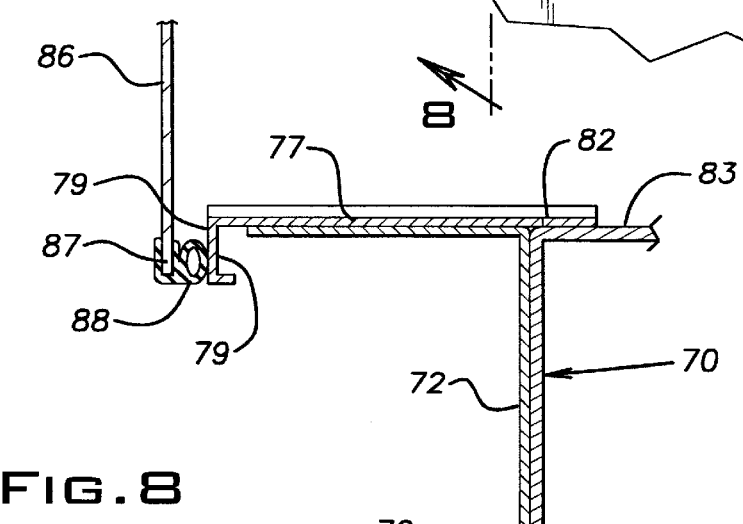
FIG. 8 is a cross-sectional view of the step threshold adaptor taken in the plane indicated at the lines 8—8 in FIG. 7.

Referring particularly to FIGS. 7 and 8, a threshold adaptor bracket 70 is located in a step pocket 71 on the vehicle chassis 12. A similar bracket, but a mirror image, is provided on the right side of the vehicle. As shown in FIG. 8, the bracket has a C-shaped cross-section in a vertical plane. The bracket 70, in the illustrated arrangement, is a weldment of two steel parts cut from steel sheet stock. A lower part 72 having a C-shape in cross-section includes a horizontal foot 73 that is formed with apertures 74 that align with apertures in a foot step thread plate 76 typically provided when the chassis 12 is originally manufactured. An upper part 77 of the threshold bracket 70 can be formed of embossed steel plate to provide a slip resistant surface. An outer edge of the upper plate is formed with a downturned flange 78. The flange 78 has a generally vertical surface 79 that is generally coplanar with surrounding vertical surfaces 81 of the original chassis. The apertures 74 align with original factory apertures 75 or apertures can be created in the thread plate 76 for purposes of fixing the adaptor bracket 70 to the thread plate with screws 69. Frequently, the chassis is originally provided with an anti-skid plate on the thread plate 76 and this anti-skid plate is removably secured with screws threaded into holes in the thread plate 76. This original anti-skid plate can be removed and the threshold bracket 70 can be substituted for it. The upper and lower threshold parts 77 and 72 can be welded together or otherwise permanently fixed to one another. As shown, the threshold bracket 70 is configured so that an upper surface 82 of the upper part 77 is generally coplanar with a floor board 83.

The threshold bracket 70 enables a door 86 forming the major part of each side 17 of the cab to be sealed adjacent the plane of the floor board 83. More specifically, a lower edge 87 of the door 86, including a weather-strip 88 can engage the vertical surface 79 of the threshold bracket. This results in a smaller, lighter door than what would ordinarily be required where the door profile followed the lower edge of the step pocket 71. This affords many benefits both to the manufacturer and user. As shown in FIG. 7, the upper part of the threshold bracket 70 is arranged to closely follow the contour of the floor board so that it creates a seal therewith.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An overhead guard for a wheeled vehicle comprising a set of generally upright corner members having lower ends arranged to be mounted on the chassis of the vehicle and upper ends remote from the lower ends, a set of generally horizontal members arranged in the general form of a rectangle in a generally horizontal plane and connected between pairs of the upper ends of the corner members, a sheet of transparent material overlying the horizontal members, a steel roof panel overlying the transparent material and having a large opening to afford overhead vision for the operator of the vehicle, and a limited number of protective rigid bars suspended generally in a horizontal plane across the area of the opening in the roof panel.

2. An overhead guard as set forth in claim 1, wherein said bars are beneath the transparent material.

3. An overhead guard as set forth in claim 1, wherein a pair of corners represent the front of the guard and a pair of corners represent the rear of the guard, said bars being aligned to run parallel to the front to rear direction.

4. An overhead guard as set forth in claim 1, wherein said bars are of rectangular cross-section.

5. An overhead guard as set forth in claim 4, wherein the long dimension of the cross-section of the bars is vertical.

6. An overhead guard as set forth in claim 5, wherein said bars are solid steel members.

7. An overhead guard as set forth in claim 1, including reinforcing gussets at the upper corners of the guard in a generally horizontal orientation, the gussets having holes for provisionally mounting an air circulating fan.

8. An overhead guard for a wheeled vehicle comprising a set of four generally vertical corner posts and a set of four frame elements lying in a generally horizontal plane, the frame elements forming a polygon in plan view and interconnecting said corner posts, and reinforcing gusset plates at a plurality of the corners of the polygon formed by the frame elements, the gusset plates being fixed to adjacent ends of pairs of said frame elements, said gusset plates having holes for optionally receiving screws used to mount an air circulating fan within the guard.

* * * * *